United States Patent [19]

Costa

[11] 4,037,256

[45] July 19, 1977

[54] CONVERGENCE CIRCUIT MOUNTING DEVICE

[75] Inventor: Thomas A. Costa, Mount Prospect, Ill.

[73] Assignee: Admiral Corporation, Schaumburg, Ill.

[21] Appl. No.: 683,329

[22] Filed: May 5, 1976

[51] Int. Cl.[2] .......... H04N 5/655

[52] U.S. Cl. .......... 358/248; 325/353; 358/254

[58] Field of Search .......... 358/248, 254, 10; 325/353

[56] References Cited

U.S. PATENT DOCUMENTS

| | | | |
|---|---|---|---|
| 2,917,735 | 12/1959 | Travis | 358/254 |
| 2,936,448 | 5/1960 | Marholz | 358/254 |
| 2,947,811 | 8/1960 | Archer | 358/254 |

*Primary Examiner*—Howard W. Britton
*Attorney, Agent, or Firm*—Cameron, Kerkam, Sutton, Stowell & Stowell

[57] ABSTRACT

A device for mounting a circuit board containing the convergence alignment circuitry for a color television receiver is described. The mounting device is made of a suitable insulating material and includes a collar or ring portion which is supported against the rear envelope of the color CRT by a plurality of integrally-formed leg members. A mounting board assembly is formed integrally with the collar or ring, extending upwardly therefrom for receiving a printed circuit board. The board mounting assembly includes first and second arms extending from the collar for receiving the lower or first edge of the circuit board and an upright support member extending therefrom, away from the collar, having at its remote end a flange from which extends a lip for retaining the upper or second edge of the printed circuit board. Normally, the printed circuit board is retained by the board mounting assembly as an integral part of the cathode ray tube and mounting device; when it becomes necessary to adjust the convergence circuit, the television technician may readily remove the circuit board which is connected by a cable to the convergence yoke disposed about the neck of the color CRT, and dispose the printed circuit board so as to adjust its elements while the technician views directly the front face of the color CRT.

9 Claims, 3 Drawing Figures

FIG. 2.
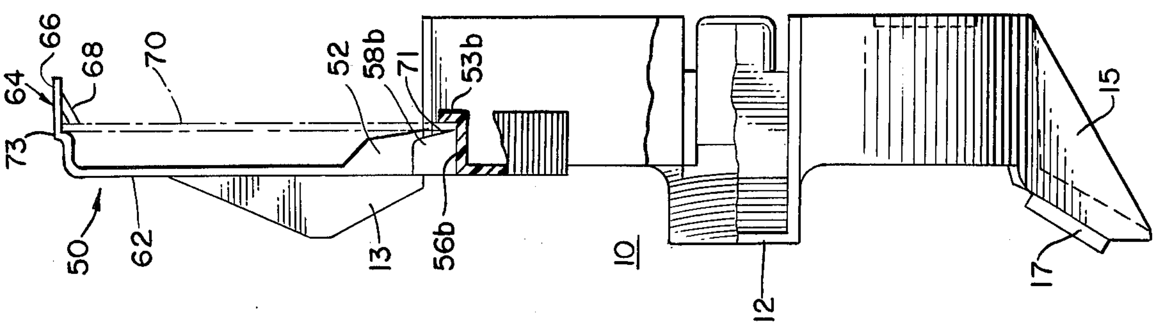
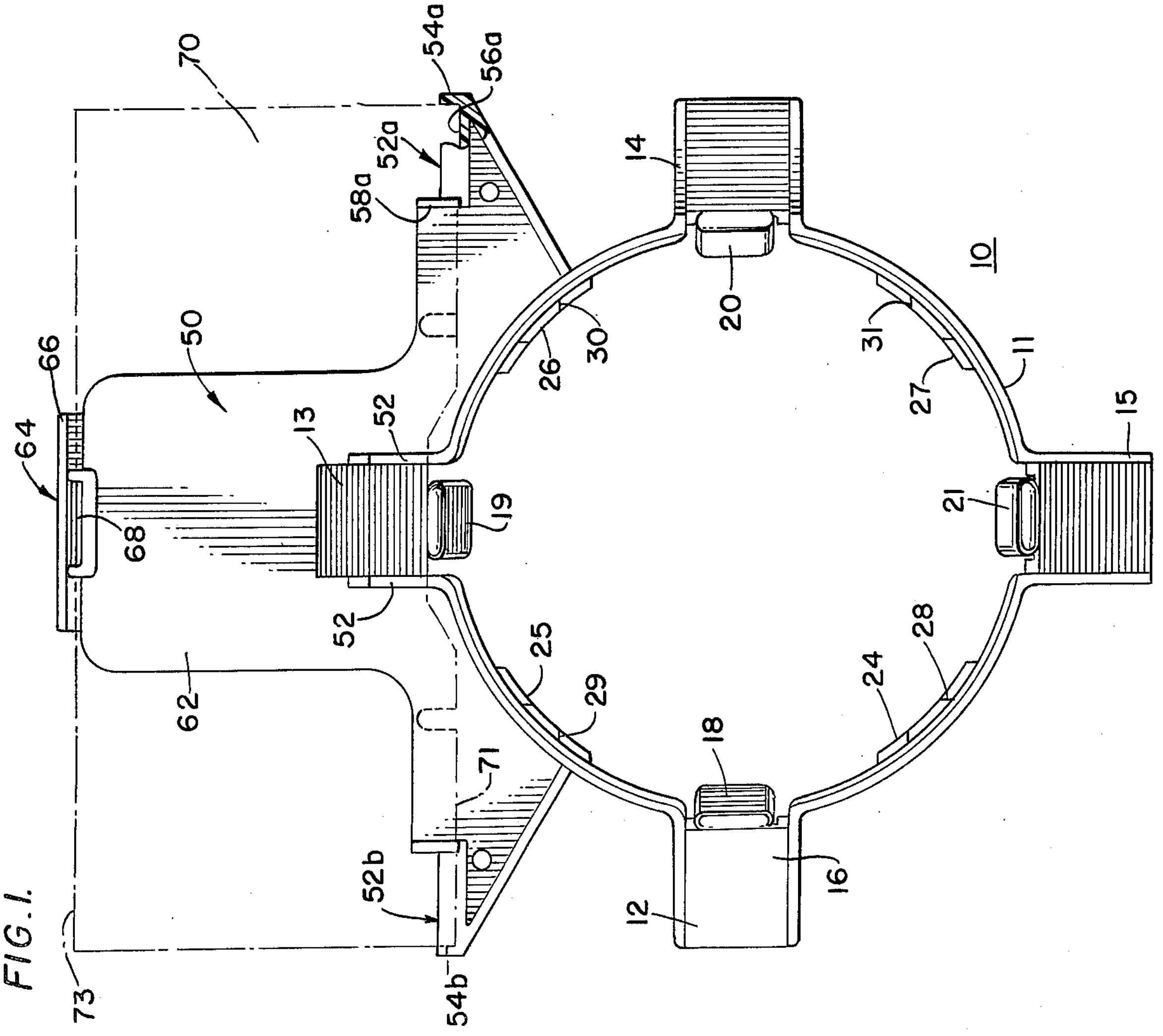
FIG. 1.

CONVERGENCE CIRCUIT MOUNTING DEVICE

BACKGROUND OF THE INVENTION

1. Field of the Invention

This invention relates to a covergence circuit board for a color cathode ray tube and in particular to a device for mounting the covergence circuit board as an integral part of the color cathode ray tube.

2. Description of the Prior Art

Color television receivers typically use a three-beam shadow mask type of color cathode ray tube (CRT) by which to converge the electron beams at all points of the viewing screen scanned by the beams. Such apparatus usually consists of a device or devices for effecting static convergece of the beams at some reference point such as at the center of the screen. Additionally, the covergence apparatus includes electromagnets by which to dynamically control the convergence of the electron beams over the entire screen. Such dynamic convergence apparatus is energized by waves varying as a function of the deflection angle of the electron beams.

It has been customary in most color CRT's to mount a convergence magnet structure at a suitable point along the neck of the CRT to influence the electron beams before they are deflected to scan the usual raster. The circuit by which the waves applied to the respective magnetic structures are suitably adjusted has, in most cases, been located on a separate control panel. The use of a separate control panel facilitates the convergence alignment in the color television receiver, which requires adjusting a large number of controls grouped together upon the control panel, typically in the form of a printed circuit board. Such a separate control panel typically would require a metal bracket, which in turn is secured by clips, bolts or other suitable fasteners to a part of the television receiver cabinet. In order to align the color convergence of the color CRT, the control panel is removed and placed in a position so that the TV technician may observe the front of the CRT screen while adjusting the controls on the convergence control panel. However, this requires a relatively long connecting cable between the convergence control panel and the convergence magnets disposed about the neck of the color CRT. In addition to a rather expensive mounting assembly upon the cabinet of the color receiver, the convergence control panel is not an integral part of the chassis or the picture tube, thus causing a potential problem during the manufacture and assembly of this receiver in that the convergence control panel must be specially handled during the movement of the receiver from work station to work station in order that it might not be damaged.

Further, the mounting of the convergence magnets associated with the convergence control panel should be of such a character that the coil elements of these magnets are urged into firm contact with the glass envelope of the color CRT to minimize the non-magnetic gaps between the coil elements and the cooperating pole pieces mounted internally of the CRT envelope.

In recent color CRT receivers, the convergence control panel has been mounted integrally about the neck of the color CRT, as shown in U.S. Pat. No. 3,377,515 of J. W. McLeod, Jr., and U.S. Pat. No. 3,818,395 of A. M. Anthony et al. In a further U.S. Pat. No. 3,637,930 of J. L. Meier, assigned to the assigned of this invention, there is shown an assembly for holding a number of circuit elements, not specifically designated to be the convergence control circuitry, that is disposed about the neck of the cathode ray tube. A particular problem associated with the mounting of such circuit boards about the neck of the color CRT resides in the adjustment of the circuitry and in particular the adjustment of the color convergence circuitry. In particular, the magnets associated with the color convergence circuitry must be very accurately placed with respect to the color electron guns of the color CRT in order to ensure accurate convergence. If during the adjustment process, the relative position of the printed circuit board and therefore the electromagnets disposed thereon is moved with respect to the color CRT electron guns, the convergence will be defeated. In addition, in order to view the front or screen of the color CRT while making adjustments of such convergence control boards, it is necessary to use a mirror, posing the additional problem of viewing a reversed image and further, with ordinary mirrors, the reflection of multiple images, making it difficult to observe the precise orientation of the series of lines or bars produced upon the display screen of the color CRT during convergence adjustment procedures.

SUMMARY OF THE INVENTION

Therefore, it is an object of this invention to provide a new and improved device for mounting convergence control circuitry integrally with the color CRT in a manner to permit its ready removal when adjustment is required.

It is a further object of this invention to provide a new and novel mounting of a convergence control circuit for a color CRT in a manner permitting the use of a shorter cable and at the same time permitting its relatively efficient, fast removal without the removal of other components of the television receiver.

It is a still further object of this invention to provide a new and novel device for mounting a convergence control circuit for a color CRT in a manner that is relatively simple and inexpensive and further, permits the integral mounting thereof with respect to the color CRT to facilitate an easier assembly and adjustment at the time of manufacture as well as of further service.

In accordance with these and other objects of this invention, there is provided a device for mounting a control board containing the color convergence control circuit for a color TV receiver, about the envelope of its color CRT, and including a collar or ring portion disposed about the neck of the color CRT, and a plurality of leg members disposed intimately in contact against the rear of the envelope of the color CRT. A board mounting assembly extends from the ring portion, and includes an upper flange extending there-from and including a retaining lip. The board mounting assembly also includes at least one arm for receiving and retaining a lower or first edge of the convergence control board, while the lip retains the upper or second edge of the convergence control board in a manner whereby the board may be readily released to permit servicing of the color CRT receiver and in particular the adjustment of its color convergence circuit.

In one aspect of this invention, the mounting device is molded as a unitary structure of a suitable insulating material to eliminate substantially insulation problems with respect to the other components of the color TV receiver.

BRIEF DESCRIPTION OF THE DRAWINGS

These and other objects and advantages of the present invention will become more apparent by referring to the following detailed description and accompanying drawings, in which:

FIG. 1 is a top, elevational view of the convergence control board mounting device of the present invention;

FIG. 2 is a side view of the convergence control board mounting device as shown in FIG. 1.

DETAILED DESCRIPTION OF THE PREFERRED EMBODIMENT

Figure 3:
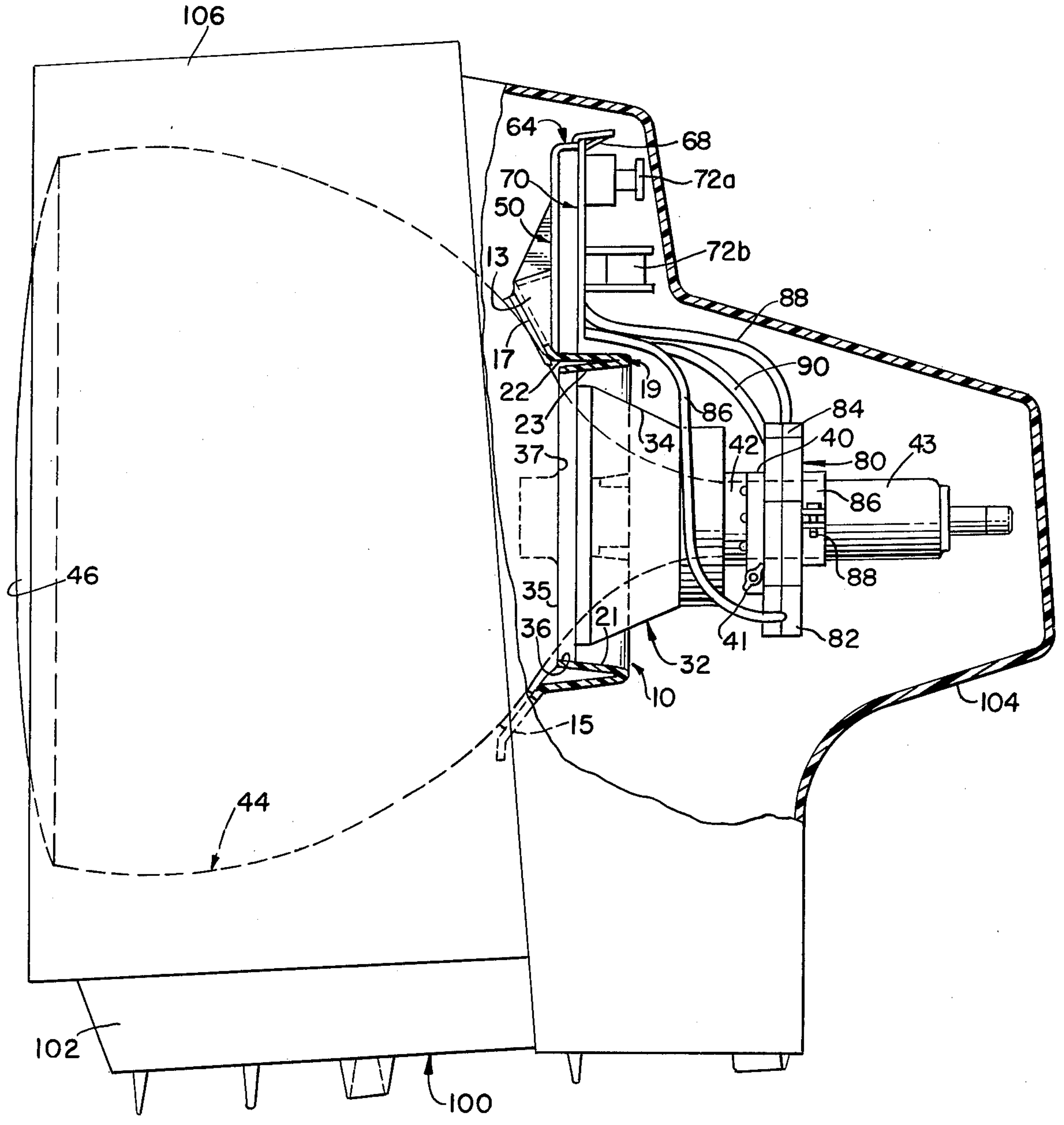
FIG. 3 shows the control board mounting device as shown in FIGS. 1 and 2, as disposed about a color CRT disposed within the TV receiver's cabinet and the manner in which the convergence control board is interconnected with its magnet convergence yoke assembly that is disposed about the neck of the color CRT.

Referring now to the drawings and in particular to FIGS. 1 and 2, there is shown a device 10 for mounting a convergence control board 70 with respect to a color CRT 44 (see FIG. 3). The device 10 has a collar or ring member 11 and a board mounting assembly 50 integrally formed as by molding a plastic-like, insulating material such as a phenylene oxide, as manufactured by the General Electric Corporation under their tradename "NORYL" and further identified by their manufacturer's numbers SE-1 and SE-100. The collar 11 has integrally-formed foot portions 12, 13, 14 and 15 which extend generally in an axial direction away from the collar 11. The foot portions 12 through 15 are used to mount the device 10 to the associated wall of a cathode ray tube 44 (see FIG. 3). In this regard, the foot portion, such as the foot portion 12, has a surface 16 which is shaped generally to conform to the configuration of the mating part of the cathode ray tube 44. By placing a doublesided pressure-sensitive adhesive tape such as the tape 17 against the mating surfaces of the foot portions 12 through 15, the collar 11 can be rigidly fastened to the backwall of the picture tube simply by slipping the collar 11 over the neck portion 43 and applying pressure to the device 10 against the backwall of the cathode ray tube 44. Once the device 10 is positioned against the backwall of the tube 44, it is essentially unremovable.

It is not necessary, however, to remove the device 10 ring from the backwall of the picture tube 44 after is has been properly positioned. This is because the device 10, itself, has a series of tab-like resilient members which are used to removably position a deflection yoke assembly 32 within the collar 11. Therefore, while the collar 11 is positioned permanently about the neck of the tube 44, the deflection yoke assembly 32 itself can be readily removed from the collar 11 and repositioned without difficulty.

The resilient tab-like members such as the member 19 comprise a U-shaped projection having one leg 22 of the U formed integrally with the collar 11 of the device 10. The other leg 23 of the U projects radially inwardly of the collar 11 in a cantilever fashion The leg 23 is sufficiently resilient so that it will deflect as the yoke assembly 32 is slid into the device 10, as seen in FIG. 3.

By positioning a number of the resilient members 18 through 21 circumferentially about the collar 11, the deflection yoke assembly 32 may be resiliently retained and centered within the device 10. Also, the deflection yoke assembly 32 may be readily removed and repositioned easily.

The collar 11 also is provided with a series of flanges 24, 25, 26 and 27. The flanges 24 through 27 are located intemediate adjacent ones of the resilient tabs 18 through 21. As the yoke assembly 32 is slid into the collar 11 of the device 10, the outermost edge of the yoke assembly 32 contacts the flanges 24 through 27, and this prevents further forward movement of the yoke assembly 32 relatively to the device 10.

Each of the flanges 24 through 27 is provided with guide ribs 28, 29, 30 and 31 which extend generally axially of the collar 11. These guide ribs tend to prevent pivotal motion of the deflection yoke assembly 32 as it is being inserted in the device 10. Therefore, these guide ribs assist in assuring that the yoke assembly 32 will contact the flanges 24 through 27 squarely and not at an angle, which might allow the deflection yoke assembly 32 to pass directly through the collar 11.

The deflection yoke assembly 32, includes a cone-shaped coil support 34. The coil support 34 has an outwardly-projecting rim 35 which is receivable within the collar 11 of the device 10. The outer perimeter 36 of the rim 35 is slid into the device 10 so that the face portion 37 thereof contacts the flanges 25 and 26. The flanges 25 and 26 stop the forward movement of the deflection yoke assembly 32, and the resilient tabs 18 through 21 firmly hold the yoke assembly 32 in position in the direction transverse to the axis of the collar 11. In positioning the yoke assembly 32 within the device 10, the perimeter 36 is guided into position by the guide ribs 28 through 31.

As seen in FIG. 3, the foot portions such as the foot portions 13 and 15 have a pressure-sensitive adhesive 17 applied thereto which permanently bonds the device 10 to the backwall of the picture tube 44. This is done by sliding the entire assembly with the deflection yoke assembly 32 in place in the device 10 onto the neck 43 of the CRT 44. The deflection yoke assembly 32 and the device 10 then are positioned properly, immediately adjacent to and spaced from the backwall of the CRT 44. When the yoke assembly 32 is found to be in the upper position, then pressure is applied to the device 10, which permanently bonds the foot portions through the adhesive to the backwall of the CRT 44. When it is desired to lock the yoke assembly 32 in position, a clamp 40 having a bolt 41 is tightened to crimp a plurality of fingers 42 about the neck 43 of the CRT 44. The front end of the yoke assembly 32 is firmly positioned by the resilient tabs 18 through 21 of the device 10, and the yoke assembly 32 is locked into position by the clamp 40 and its bolt.

As shown in FIG. 3, a convergence yoke assembly 80 is disposed about the neck 43 of the CRT 44, immediately adjacent the fingers 42 of the yoke assembly 32 and is secured thereto by a clamp 86 that is tightened about the neck 43 by a suitable fastener such as a bolt 88. As partially illustrated in FIG. 3, the convergence yoke assembly 80 includes a green assembly 82 wherein an adjustable magnet is disposed comprising such an element as manufactured by the Admiral Corporation under their number 94A303-80, a blue convergence assembly 84 illustratively taking the form of such an assembly as manufactured under the Admiral designation No. 94A303-81, and a red convergence assembly (not shown), as manufactured under the Admiral Corporation number 94A303-82. As shown in FIG. 3, each of the green assembly 82, blue assembly 84 and red assembly, is connected by its cable 86, 88 and 90, respectively, to the convergence control board 70. As shown in part in FIG. 3, the convergence control board 70 illustratively takes the form of a printed circuit upon which are mounted the appropriate elements therefor including the inductive elements 72*a* and 72*b* as would be incorporated in such a circuit. Though not forming a part of the subject invention, the convergence circuitry as incorporated upon the control board 70 may be any conventional circuit such as that disclosed in one of U.S. Pat. Nos. 3,419,749; 3,602,764 or 3,613,109, each of which is assigned to the assignee of this invention.

The subject matter of the present invention more particularly relates to the device 10 and in particular to the board mounting assembly 50, as particularly illustrated in FIGS. 1 and 2. The board mounting assembly 50 includes a first arm 52*a* and a second, like arm 52*b*, for receiving the first or lower edge 71 for the convergence control board 70, shown in dotted line in FIGS. 1 and 2. The first and second arms 52*a* and 52*b* are essentially similar and include a cam surface 58 for guiding the lower edge 71 of the board 70 into a recess formed between the cam surface 58 and a retaining wall 53. Further, each arm 52 includes a side edge retaining wall 54, whereby the panel 70 is effectively retained between the edges 54*a* and 54*b* of both of the arms 52*a* and 52*b*. A further set of cam surfaces 52 is shown for guiding the rear surface of the convergence control board 70 so that its lower edge 71 is readily disposed in contact with the resilient tab 19.

The upper or second edge 73 of the convergence control panel 70 is received by an upper edge retaining assembly 64, integrally associated with an upright support member 62 of the board mounting assembly 50. As particularly shown in FIG. 2, the upper edge retaining assembly 64 includes a flange-like member 66 extending from the upright support member 62 and including the lip 68 that is compressible to permit release of the upper edge 73 of the convergence control board 70. The device 10, being made of a plastic-like materials as identified above, is resilient, permitting the retaining lip 68 to be depressed to permit the release of the upper edge 73 and the ready removal of the convergence control board 70. In order to insert the convergence control board 70, its lower edge 71 is disposed against the cam surfacees 58*a* and 58*b*, whereby it is guided into a retaining relationship with the arms 52*a* and 52*b* in the manner as described above.

As shown in FIG. 3, the CRT 44 is mounted within a housing 100 including a cabinet 102 and a rear, removable cover 104 that is attached to the cabinet 102 by suitable means such as screws. If it is desired to service the color TV receiver, the television technician removes the rear cover 104 and depresses the retaining lip 68, thus permitting removal of the convergence control board 70, which now may be placed upon a top surface 106 of the housing 100. Now, with the technician viewing a front or display surface 46 of the CRT 44, he may readily adjust the convergence circuitry as mounted upon the convergence control board 70, without any possible confusion due to the use of a mirror as required by the prior art. Further, since the convergence control board 70 is not then connected to the CRT and is separate from the convergence yoke assembly 80, the adjustment as by appropriate tools does not misalign the position of the yoke assembly 32 or the color convergence yoke assembly 80 with respect to the electron guns of the CRT 44, thus assuring that these convergence adjustments do not dislocate the relative positioning of the convergence yoke assembly 80 with respect to the electron guns of the color CRT 44. Further, it can be seen that in the assembly and manufacture of this color TV receiver, the convergence board 70 is made an integral part of the receiver, even before it is disposed within its housing 100, and thus is not subject to damages that otherwise might have occurred with the assemblies of the prior art.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. In a television receiver, a device for releasably positioning a control panel with respect to a cathode ray tube (CRT) of the receiver, said control panel having a circuit of said TV receiver disposed thereon, said positioning device comprising:

a. an annular member adapted to be disposed about said CRT; and b. means associated with said annular member for releasably securing said control panel to said device and in a predetermined relationship with respect to the CRT.

2. A positioning device as claimed in claim 1, wherein said device includes a board mounting assembly extending from said annular member and including said releasably securing means disposed at a position remote from said annular member.

3. A positioning device as claimed in claim 2, wherein said releasably securing means comprises a flexible lip that may be depressed from a first control panel securing position to a control panel releasing position, whereby the control panel may be removed from said device.

4. A positioning device as claimed in claim 1, wherein there is further included a further receiver circuit element that is coupled by an electrical conductor to said circuit mounted upon said control panel.

5. A positioning device as claimed in claim 4, wherein said circuit comprises a color convergence adjustment circuit and said further receiver circuit element comprises a color convergence yoke assembly adapted to be disposed about the neck of said CRT.

6. A positioning device as claimed in claim 1, wherein said device is formed integrally of an insulating material.

7. A positioning device as claimed in claim 1, wherein said control panel includes first and second edges and said positioning device includes a board mounting assembly extending from said annular member and including at a portion remote from said annular member, a retaining lip for releasably securing said second edge of said control panel, and a first arm disposed relatively close to said annular member for receiving said first edge of said control panel.

8. A positioning device as claimed in claim 7, wherein there is included a second arm disposed relatively close to said annular member for also receiving said first edge of said control panel.

9. A positioning device as claimed in claim 7, wherein said device includes a cam surface for guiding said first edge of said control panel into a retaining relationship with said first arm.

* * * * *